UNITED STATES PATENT OFFICE.

OSCAR WENDLER, OF LEIPZIG, GERMANY, ASSIGNOR TO DR. N. GERBERS CO. M. B. H., OF LEIPZIG, GERMANY.

PROCESS FOR THE DETERMINATION OF FAT IN MILK AND OTHER DAIRY PRODUCTS.

961,564.      Specification of Letters Patent.      Patented June 14, 1910.

No Drawing.      Application filed March 11, 1910. Serial No. 548,675.

*To all whom it may concern:*

Be it known that I, OSCAR WENDLER, a subject of the German Emperor, and resident of Leipzig, in the Empire of Germany, have invented a certain new and useful Improved Process for the Determination of Fat in Milk and other Dairy Products, of which the following is a specification.

What are called the quick methods for determining the proportion of fat in dairy products such as milk for example are based upon dissolving the casein inclosing the fatty globules by a suitable means thereby liberating the fat, whereupon by the addition of an appropriate fat clarifying agent and with the assistance of centrifugal force the fat is completely separated. The means serving for dissolving the casein and for clarifying the fat, if satisfactory results are to be obtained in determining the quantity of fat, must be such that the casein is not caused to coagulate and no saponification of the fat can take place, as if either of these defects arise irregularity in the separation of the fat in the centrifugal treatment invariably results. The means generally employed heretofore for dissolving albumen have been acids or lyes or tartaric alkaline salts to which an equal quantity of free alkali is added until the effective value of the tribasic phosphoric alkaline salts (which in solution separate free alkali) which dissolves the casein is reached. The fat clarifying means are butyl and amyl alcohol.

Heretofore two different methods have been employed for determining the proportion of fat, one of them being based upon adding the two agents to the milk separately, while the other consists in the employment of a single solution which when added produces both actions in the milk. The present process renders it possible to use either one or the other of the methods of treatment. The several methods are hereinafter described in succession, an essential feature being the employment of neutral salts for dissolving the casein.

The solvents heretofore employed for casein are not entirely unobjectionable because, on the one hand owing to their saponifying action they prejudicially influence the result of the experiment, while on the other hand owing to their corrosive action they create considerable danger for persons carrying out this process. Owing to the recognition of this defect attempts have been made to determine the quantity of fat in dairy products by what is called the phosphate process by means of phosphoric salts. Even these salts cannot be classed as neutral, however, because in the solution alkali is separated and it is by this alkali that the casein is dissolved. The active proportion of alkali in these salts is such, however, that in order to attain the desired result a relatively high temperature amounting to as much as 70° C. must be allowed to act for some time, thereby giving rise not only to the danger of a saponification of the fat but also to the coagulation of the casein, thereby rendering the separation of the fat difficult and imperfect. Operation at such a high temperature is very uncomfortable and retards the work, particularly in view of the great heat of the glass vessels and in particular renders the reading of the results obtained difficult. It should also be noted that the phosphoric salts required for carrying the process into practice must be used in such a concentrated solution that even at ordinary temperatures they become crystallized in the receptacles in which they are kept in which case owing to their weaker concentration the remaining solution cannot furnish perfect results. Accordingly in practice incalculable loss of time and material is caused in these conditions.

Now in accordance with the present invention in order to speedily determine the proportion of fat in dairy products and in milk in particular, the albumen dissolving means employed are entirely neutral and do not act on litmus paper for example, either in one sense or the other. As a result of experiments the salts of oxybenzoic acid have proved chiefly suitable in this connection. In particular sodium salicylicate may be referred to by way of example but other substances that can be used are potassium salt, ammonium salt and lithium salt and finally the salts of m-oxybenzoic acid and of p-oxybenzoic acid. As already stated these salts are completely neutral and form with casein a compound soluble in water. A particularly important feature is that no alkali is separated, this substance as stated above being the active agent in dissolving the casein in the known processes. Another feature of considerable importance is that when the said neutral salts are used the casein is dissolved very speedily even at a temperature of 40° C. and that no saponification of the fat or coagulation of the casein takes place. The solvent power of the salts is so much higher that even in a cold state the salts are not separated out or decrystallized so that neither irregularities as a result of alteration in the degree of concentration nor losses of material need be feared. The said salts present the further advantage that they not only dissolve the casein as in the known processes but also the albumen which was separated out particularly in the phosphate process. The separation of the fat is therefore much more certain and exact. Obviously any convenient known fat clarifying agent can be utilized in conjunction with the said salts as a solvent for the albumen.

In carrying out the examination of milk the following charge may be used in the butyrometer, for example: 3 g. sodium salicylicate dissolved in 11 ccm. of water; 10 ccm. of milk; 2 ccm. of butylalcohol as fat clarifying agent.

When potassium salt is used the following charge may be employed: 2.5 g. potassium salt dissolved in 10 ccm. of water; 10 ccm. of milk; 2 ccm. of butylalcohol. With ammonium salt: 3.5 g. of ammonium salt dissolved in 10 ccm. of water; 10 ccm. of milk; 2 ccm. of butylalcohol with lithium salt; 3 g. of lithium salt dissolved in 10 ccm. of water; 10 ccm. of milk; 2 ccm. of butylalcohol. Similarly the salts of m-oxy benzoic acid or p-oxy benzoic acid may be used. In utilizing the last named salts the quantity of butylalcohol can be reduced.

A butyrometer charge can be composed in somewhat the following manner: 3 g. of salt of the m- or p-oxy benzoic acid dissolved in 10 ccm. of water; 10 ccm. of milk; 1 ccm. of butylalcohol. The said salts of the benzoic acids may be utilized either alone or in appropriate mixtures.

It has likewise proved to be advantageous to mix with these albumen solvents certain other salts serving on the one hand in the known manner for increasing the specific weight of the liquid, dissolving the albumen relatively to the liquid dissolving the fat thereby facilitating the division of the two liquids and accelerating the separation of the fat while at the same time they also assist in dissolving the casein and consequently in clarifying the fat. Such added salts may consist for example of saccharates which in view of the property last referred to render it possible to reduce the quantity of butyl or amyl alcohol required, thereby increasing the exactitude of the results of the experiment. It should be borne in mind that the less alcohol is required the sooner the albumen dissolving liquid is in a condition to retain this alcohol and thereby prevent it from passing into the fat. This therefore prevents the experimental results from becoming too high. If such salts are added a butyrometer charge of somewhat the following composition may be employed: 1 g. of sodium salicylicate (or potassium of lithium salt); 0.5 g. of sodium citrate or saccharate; 1 ccm. butylalcohol.

The experiments made with the salts of the oxybenzoic acids as the casein solvents have disclosed a further valuable property of the salts residing in the fact that in the determination of the quantity of fat the salts exert an extremely favorable action on the employment of the other agents used as regards the increase of their solubility in water. It is obvious that this fact is very important in determining the quantity of fat in milk but it also entails the possibility of employing considerably diluted alcohol solutions for clarifying the fat in the milk.

In the quick method for determining the quantity of fat in milk butyl and amyl alcohol are required only in very small quantities: for example a quantity of 0.6 ccm. for an experiment. The alcohol must, however, be very exactly measured as even slight variations are capable of influencing the result of the experiment. It is therefore very desirable to be able to dilute the alcohol required for the experiment to such an extent that for a given test a correspondingly greater dose of dilute alcohol can be utilized so that owing to the larger dose small pipette faults do not exert an important influence.

Attempts have already been made to effect improvements in the direction indicated by increasing the solubility of the butyl or amyl alcohol by the addition of ethyl or similar alcohols. This method has not proved to be advisable, however, because the larger proportion of alcohol thereby necessitated produced defects of another kind; for example in the process for determining the quantity of fat in milk and the like referred to above the casein was separated as coagulum which rendered it impossible to completely separate the fat by centrifugal treatment. On the other hand the proposal to add phosphates or acetates, such for example as potassium acetate for dissolving such alcohols is inadmissible because as simple experiments show the larger the quantity of these salts added the more the solubility of the alcohols in water is reduced. Another means for avoiding the said defects in the process for determining the quantity of fat in milk and the like may therefore consist in dissolving the quantity of alcohol necessary in water. Its natural solubility is, however, so small that this would necessitate a volume which could not be utilized in the fat determining vessels (butyrometers) used for determining the quantity of fat. The quantity of butylalcohol required for an experiment in the fat-determining process which amounts to about 0.6 ccm. would require about 6 ccm. of water for completely dissolving it, while the butyrometer would not provide a capacity of more than 2 ccm. for the reception of the butylalcohol in dilute form. Accordingly if it be desired to dilute the butylalcohol with water for the purpose specified it is necessary to increase the solubility of the butyl or amyl alcohol in water. Now it has been found that the solubility is largely increased when salts of the oxybenzoic acids are added to the alcohol. The addition of a larger or smaller quantity of these salts correspondingly increases the solubility of the alcohol in water so that the necessary quantity of alcohol can be completely dissolved in a limited quantity of water.

A ready-prepared or "stock" solution for determining the quantity of fat may be composed as follows, for example: 8 parts of butyl alcohol; 3 parts of water; 0.4 part of sodium salicylicate. Of this stock solution in which the alcohol is completely dissolved about 2 ccm. can be used in each experimental glass for carrying out the fat determining process thus considerably reducing inaccuracies in the results, even in the case of somewhat small pipette faults. The importance of this dilution of the alcohol as regards the influence of pipette faults on the final result is shown by the following example. Assuming that in measuring 0.6 ccm. of butylalcohol a pipette fault amounting to +0.05 occurs. This would cause the quantity of fat indicated in the butyrometer to be $\tfrac{2}{10}\%$ in excess. If, however, the above quantity (0.6 ccm.) of butylalcohol in aqueous solution is used (2 ccm. in all), if the same pipette fault should occur the excess indication of butylalcohol would amount only to 0.015 ccm. and consequently the result of the experiment would give only 0.3% of fat in excess. The dilution of the alcohol is therefore of very considerable importance from the practical standpoint.

In the large number of milk tests which are made daily in practice the separate measurement of the albumen dissolving and fat clarifying agents required for each separate test must be regarded as a defect, because this separate measuring is not only inconvenient and tedious but mainly because the addition of alcohol as fat clarifying agent is very frequently forgotten so that the test is useless and must be repeated. It was therefore an obviously desirable step to use the two agents required in testing milk, that is to say the albumen dissolving and the fat clarifying agents, as a single solution so that it was only necessary to use this one solution in a suitably measured quantity for each test. The composition of the single solution heretofore known and produced by the Nahm process was far from satisfactory, however, on the one hand because a strongly alkaline liquid was used for dissolving the albumen and this in all cases entailed a more or less vigorous saponification of the fat. On the other hand it was necessary, in order to introduce a sufficient quantity of the amyl alcohol used as a fat-clarifying constituent (and as is known is soluble with difficulty) in solution into the single liquid it was necessary to add relatively large quantities of ethyl alcohol so that finally the single solution presented an excessive proportion of alcohol which necessarily caused the casein to coagulate. The saponification of the fat on the one hand and the coagulation of the casein on the other hand produced so incomplete a separation of the fat that the result obtained was absolutely unreliable. In addition to this owing to the employment of a strong lye the manipulation of these liquids was very unpleasant and more or less harmful to the health of the person operating with them.

The employment of salts of the oxybenzoic acids which forms the object of the present invention therefore obviates the defects heretofore experienced in the composition of a single fat-determining solution because as is obvious from what has already been stated in employing the salts and butyl or amyl alcohol a liquid can very readily be formed which acts both as a solvent for the casein in the milk and also as a clarifying agent for the fat. As this single solution only contains the quantity of alcohol absolutely necessary for clarifying the fat, that is to say a very small quantity as compared with that used in the known Nahm process the coagulation of the casein hitherto caused by the excessive quantity of alcohol will no longer occur.

Having now particularly described and ascertained the nature of my said invention and in what manner the same is to be performed, I declare that what I claim is:—

1. The herein described process of determining the quantity of fat in a dairy product, which consists in mixing with said product to be tested one or more salts of an oxybenzoic acid and a fat-clarifying agent, and in measuring the quantity of fat separated thereby.

2. The herein described process of determining the quantity of fat in a diary product, which consists in mixing sodium salicylicate and butylalcohol with said product to be tested, and in measuring the quantity of fat separated thereby.

3. The herein described process of determining the quantity of fat in a dairy product, which consists in mixing one or more salts of an oxybenzoic acid with said product to be tested, in subsequently adding thereto a solution of alcohol in an aqueous solution of one or more salts of an oxybenzoic acid, and in measuring the quantity of separated fat.

4. The herein described process of determining the quantity of fat in a dairy product, which consists in mixing with said product to be tested a mixture composed of one or more salts of an oxybenzoic acid, a saccharate and a fat-clarifying agent, and in measuring the quantity of fat separated thereby.

In testimony, that I claim the foregoing as my invention, I have signed my name in presence of two subscribing witnesses.

OSCAR WENDLER.

Witnesses:
 RICHARD FANDER,
 D. E. LOBECK.